Feb. 18, 1941.  N. L. ETTEN  2,232,377
WRINGER DRIVE
Filed Feb. 4, 1938  2 Sheets-Sheet 2

Inventor:
Nicholas L. Etten

Patented Feb. 18, 1941

2,232,377

UNITED STATES PATENT OFFICE 2,232,377

WRINGER DRIVE

Nicholas L. Etten, Waterloo, Iowa

Application February 4, 1938, Serial No. 188,709

2 Claims. (Cl. 68—253)

This invention relates to wringer mechanisms, and particularly to a means for automatically disengaging the driving connection to a pair of wringer rolls in response to the operation of the usual emergency pressure release.

Most domestic wringers on the market today include a pair of power driven rolls urged into engagement with each other by means of a pressure spring and are provided with an emergency release whereby this pressure may be instantly released. It is recognized in the art that in order to provide the maximum degree of safety to the operator it is not only necessary that the spring pressure be released, but it is also necessary that the power driving connection to the rolls be instantly disengaged in order that the rolls may stop revolving.

This result is not difficult to accomplish, but the necessity for an extremely simple and rugged construction capable of withstanding neglect and abuse, coupled with the highly competitive nature of the manufacturing industry combine to create a demand for such a mechanism of a simpler and more dependable nature than those heretofore developed.

In this connection it might be pointed out that present-day wringers may be divided into two general classes. The first of these classes may be characterized by the fact that one of the rolls is resiliently displaceable from its normal axis in order to accommodate articles passing between the rolls, while the other roll (which is usually the power driven roll) is displaceable by means of the emergency release mechanism in order to effect a release of the spring pressure. The present invention is not concerned with this class of wringers, since here the desired effect may be accomplished by simply driving the roll by a pair of gears that will automatically disengage when the roll is moved laterally.

The second class of wringers is inherently of much greater simplicity since in this class the driven roll is substantially stationary upon its axis, and both the normal resilient displacement and the emergency release are accomplished by moving the idler roll. These wringers have a great advantage as to simplicity, ruggedness, and cost of manufacture, but have heretofore had the disadvantage that no fully satisfactory roll stop has been available and it has, therefore, been necessary to resort to auxiliary devices such as linkages or control rods extending to and adapted to disengage the driving means within the power head.

It is, therefore, a primary object of this invention to provide a new and improved roll stop mechanism for domestic wringers.

Another object is to provide a wringer having a laterally movable idler roll and a normally stationary driven roll with means whereby the normally stationary roll may move a limited amount in the direction of the idler roll at the time of pressure release, and means responsive to this limited movement for disengaging the driving connection to the rolls.

Another object of the invention is to provide a wringer of the type in which both the normal axial displacement and the emergency release movement are accomplished by the lateral movement of one roll, with a roll stop mechanism wherein the driving connection to the rolls is disengaged by a relatively small lateral movement of the normally stationary roll.

Other objects will appear hereinafter.

Referring now more particularly to the drawings.

Figure 1:
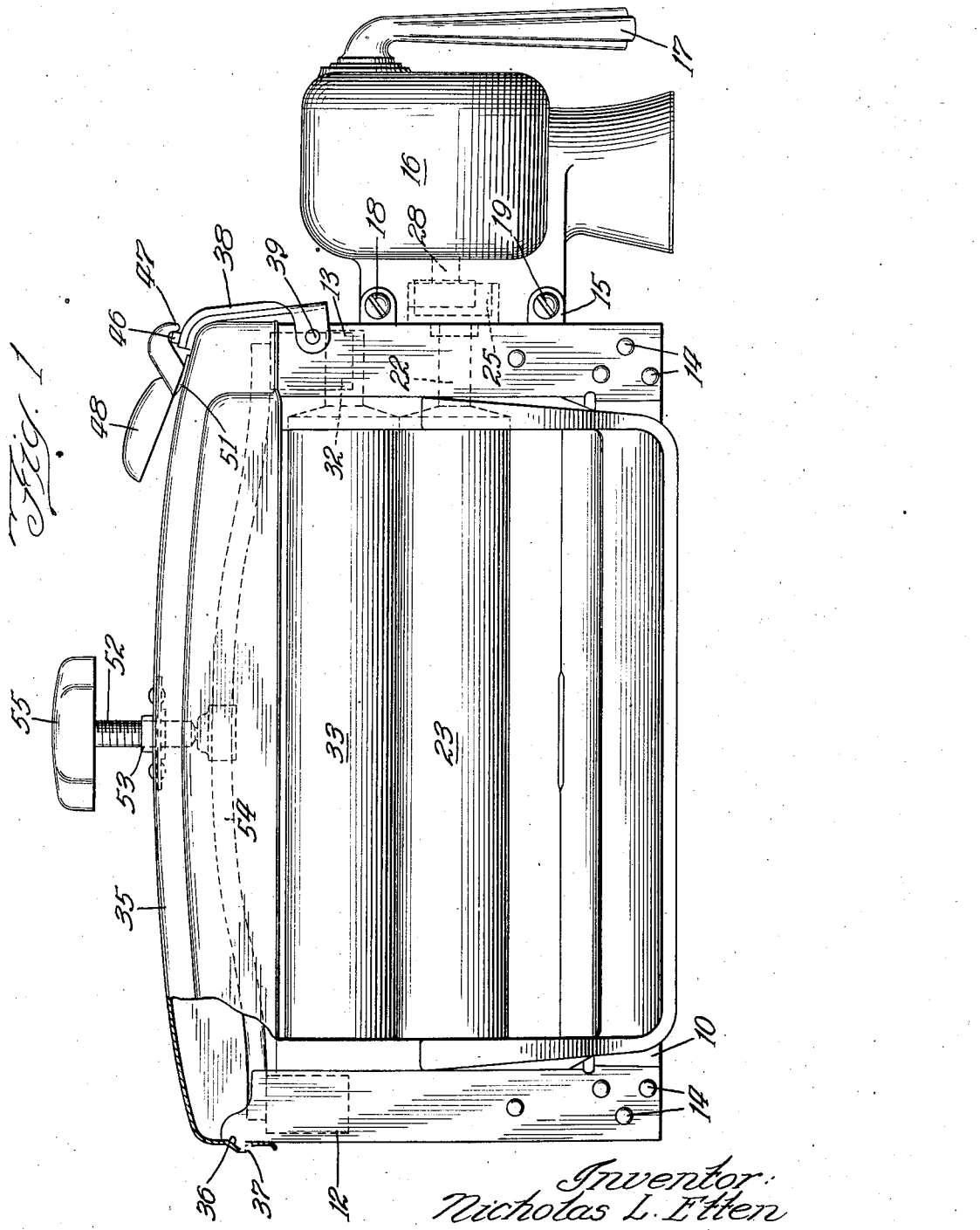
Fig. 1 is a side elevation of a wringer constructed in accordance with the principles of this invention.

The frame of the wringer is preferably constructed with a longitudinally extending bottom channel 10 at each end of which a vertically extending bearing slide 12 and 13 is secured, as, for example, by means of rivets 14 or by spot welding. The bearing slide 13 is provided with a mounting bracket 15 by means of which the entire wringer structure is secured to a power head 16, containing the usual reversing gears operated by means of the control handle 17. This mounting bracket may be secured to the bearing slide 13 in any desirable way or may be formed as an integral part thereof, but is preferably secured to the power head 16 by means of the machine screws 18 and 19.

The bearing slides 12 and 13 are substantially channel shaped in cross section and are provided with a pair of lower roll bearings 21, in which the shaft 22 of a lower wringer roll 23 is journaled. These lower wringer roll bearings 21 are loosely mounted within the bearing slides 12 and 13, but are limited in their downward movement within these slides by stop members 24 which in the present instance are formed on either end of the longitudinally extending bottom channel 10. An internal gear 25 is keyed to the roll shaft 22 by means of the key 26 and is adapted to mesh with the pinion gear 27 affixed to a drive shaft 28 extending from the power head 16.

A pair of upper wringer roll bearings 31 are loosely mounted within the bearing slides 12 and 13 and carry the roll shaft 32 of an upper wringer roll 33. A top housing 35 extends between the bearing slide 12 and the bearing slide 13, being secured to the bearing slide 12 by means of a projection 36 which is formed on the bearing slide 12 and which is adapted to engage a perforation 37 formed on the top housing 35. This top housing 35 is secured to the bearing slide 13 by means of a manually releasable latch mechanism. This latch mechanism comprises a hook portion 38 which is pivotally mounted upon the bearing slide 13 by means of a rivet 39 and which includes an upper curved portion 41 so shaped as to engage the upper corner 42 of the top housing 35. A latch stud 46 is carried by this hook portion 38 and is normally engaged by a latch 47 formed as an extension to a manually operable release handle 48 which is pivotally mounted upon the pin 49 secured to the top housing 35 and which is normally urged in a counter-clockwise direction (as viewed in the drawings) by means of a leaf spring 51.

A tension adjusting screw 52 is threaded into a boss 53 secured to the upper surface of the top housing 35 and this screw extends downwardly within the housing 35 in order to contact a pressure spring 54 which rests upon and extends between the pair of upper roll bearings 31. The adjusting screw 52 is provided with a hand wheel 55 such that it may be turned down in order to force the pressure spring 54 downwardly against the upper roll bearings 31 in such a manner as to force the upper roll 33 into resilient engagement with the lower roll 23.

Figures 2, 3:
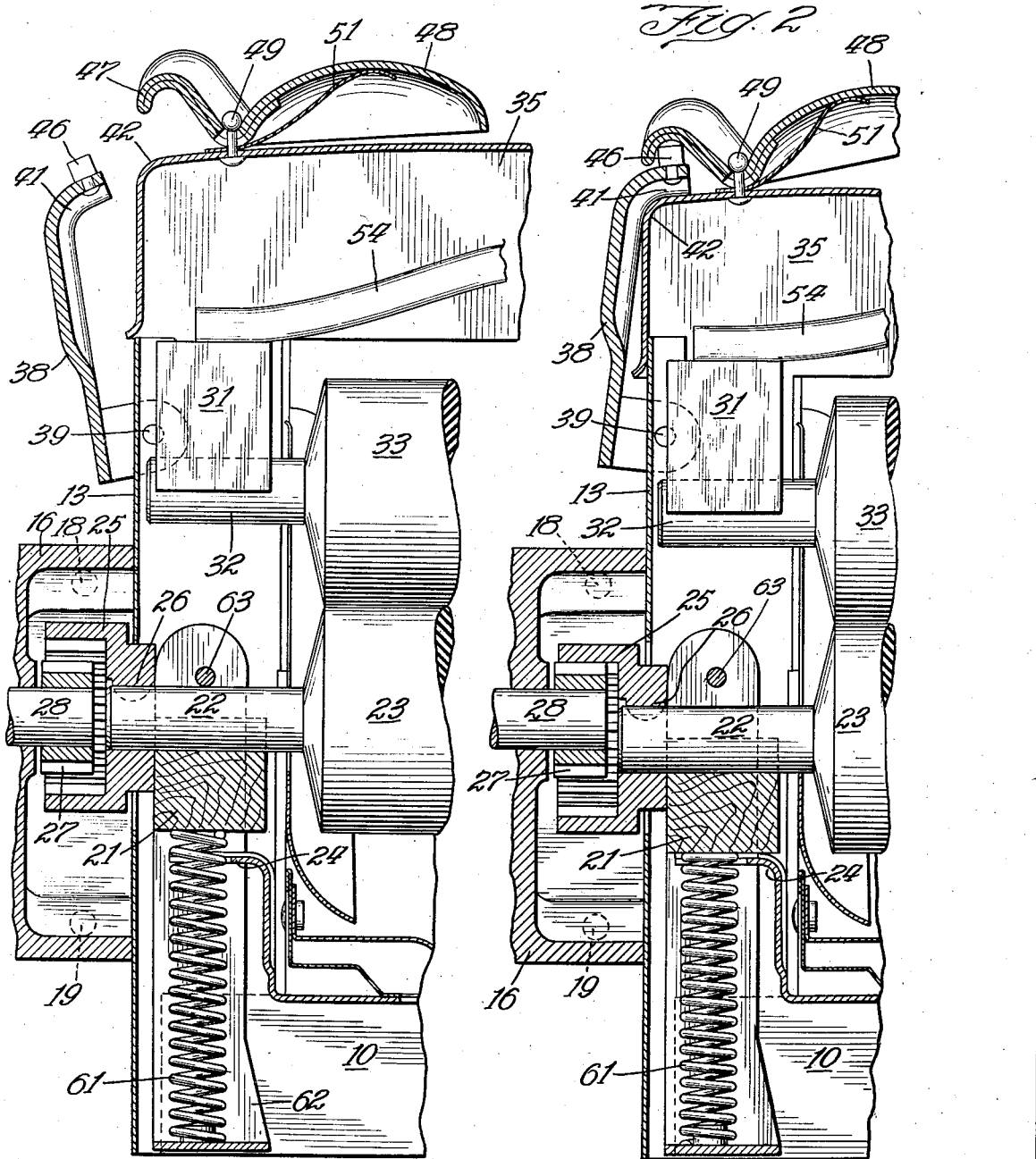
Fig. 2 is a fragmental longitudinal sectional view through one of the vertical bearing slides showing the method of mounting and driving the wringer rolls.
Fig. 3 is a sectional view similar to Fig. 2, but having the several parts in released position.

An initial pressure having been established between the roll 23 and 33, the machine is ready for operation, since at this time the latch mechanism associated with the top housing 35 will act to maintain the top housing 35 in the position illustrated in Fig. 3. It will be appreciated that the leaf spring 51 prevents the latch 47 from disengaging from the latch stud 46 and that since the curved portion 41 of the hook 38 cannot move outwardly to disengage the corner 42 of the top housing 35, this top housing 35 will be secured against any upward movement.

In the event that it is necessary to operate the emergency release mechanism, the operator may manually strike the release handle 48, thus releasing the latch 47, allowing the hook 38 to disengage the top housing 35 and therefore allowing this top housing 35 to be thrown upwardly by the force exerted by the pressure spring 54. As hereinbefore pointed out, it is desirable at this time to not only release the pressure relationship existing between the rolls, but also to disengage the driving connection to these rolls and to thus stop their rotation.

To this end a coil spring 61 may be mounted under the lower roll bearing 21 housed within the bearing slide 13 in such a manner as to tend to move this bearing 21 upwardly. The lower end of this spring 61 may be mounted in any desirable manner, it having been found convenient to provide a U-shaped spring mounting bracket 62, which extends upwardly along the inner walls of the bearing slide 13 to a point slightly above the roll shaft 22 where it is secured by means of a cross rivet 63.

When the pressure between the rolls has been released, the tension of this spring 61 is sufficient to overcome the weight of the bearings, rolls and top structure and will thus move these parts upwardly into the position illustrated in Fig. 3 of the drawings. This movement is sufficient to cause the internal gear 25 to disengage from the pinion 27 carried by the drive shaft 28 and will, therefore, break the driving connection between the power head 16 and the rolls 23 and 33. In order to prevent the roll 23 from rising to the extent that the lower half of the internal gear 25 will engage the pinion 27, the cross rivet 63 is located in proper position to act as a stop for the upper limit of movement of the lower roll shaft 22.

The wringer rolls may be reset by unscrewing the adjusting screw 52 and reengaging the emergency release mechanism after which the adjusting screw 52 is again turned down in order to move the pressure spring 54 downwardly and apply the proper initial pressure between the rolls 33 and 23. When this is done, it will be obvious that the relatively great pressure exerted by the spring 54 will readily overcome the light upward pressure exerted by the coil spring 51 and the lower roll bearing 21 will, therefore, be again moved downwardly into positive engagement with the stop 24. At this time the internal gear 25 and pinion 27 will reengage and the wringer will be ready for operation.

From this it will be seen that this construction provides a simple and rugged roll stop mechanism which is both dependable in operation and highly economical in manufacture.

While I have shown and described the present preferred embodiment of this invention, it is subject to numerous modifications without departing from the invention spirit and I, therefore, do not wish to be limited except as by the scope of the appended claims.

I claim:

1. In a wringer including a frame, a pressure spring and a pair of pressure rolls rotatably mounted in the frame and each consisting of a roll shaft and a resilient roll surface, the combination of a roll drive assembly including a driving unit consisting of a power drive shaft, a fixed bearing for said drive shaft, and a spur pinion solidly affixed to the end of said drive shaft; and a driven unit consisting of an internal gear solidly affixed to the roll shaft of one of the aforesaid rolls, said internal gear including a rim and teeth projecting inwardly from the rim and having an internal diameter greater than the outside diameter of the driving spur gear; a bearing for the wringer roll shaft intermediate said internal gear and the resilient surface portion of the roll, a bearing support for said bearing, and means to shift the bearing in a lateral direction with respect to the axis of the roll shaft.

2. In a wringer including a frame, a pressure spring, and a pair of pressure rolls rotatably mounted in the frame and each consisting of a roll shaft and a resilient roll surface, the combination of a roll drive assembly including a driving unit consisting of a power drive shaft, a fixed bearing for said drive shaft, and a spur pinion solidly affixed to the end of said drive shaft; and a driven unit consisting of an internal gear solidly affixed to the roll shaft of one of the aforesaid rolls, said internal gear including a rim and teeth projecting inwardly from the rim and having an internal diameter greater than the outside diameter of the driving spur gear; a bearing for the wringer roll shaft intermediate said internal gear and the resilient surface portion of the roll, a bearing support positioned with respect to the drive shaft to locate the spur gear and internal gear in meshing position, a spring to urge the roll shaft bearing, roll shaft, and internal gear toward a concentric position with respect to the driving spur gear and the drive shaft, and a stop to limit the movement of said bearing, shaft, and gear.

NICHOLAS L. ETTEN.